US011590959B2

(12) United States Patent
Johnson et al.

(10) Patent No.: US 11,590,959 B2
(45) Date of Patent: Feb. 28, 2023

(54) HYBRID VEHICLE TRANSMISSION SHIFT CONTROL FOR ELECTRIC MACHINE THERMAL MANAGEMENT

(71) Applicant: Ford Global Technologies, LLC, Dearborn, MI (US)

(72) Inventors: Kelly Johnson, Northville, MI (US); Rian Edman, Dearborn, MI (US); Gregory Dean Ognjanovski, Shelby Township, MI (US); Garrett Carlson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 130 days.

(21) Appl. No.: 17/142,954

(22) Filed: Jan. 6, 2021

(65) Prior Publication Data

US 2022/0212655 A1    Jul. 7, 2022

(51) Int. Cl.
*F16H 59/18* (2006.01)
*B60W 20/30* (2016.01)
(Continued)

(52) U.S. Cl.
CPC ............ *B60W 20/30* (2013.01); *F16H 59/18* (2013.01); *F16H 59/44* (2013.01); *F16H 59/72* (2013.01); *B60W 30/1843* (2013.01); *B60W 2510/087* (2013.01); *B60W 2510/107* (2013.01); *B60W 2510/246* (2013.01); *B60W 2510/305* (2013.01); *B60W 2520/10* (2013.01);
(Continued)

(58) Field of Classification Search
CPC .............. F16H 59/18; F16H 2059/144; F16H 2059/145; F16H 59/14; F16H 2059/366; F16H 59/44; F16H 2059/446; F16H 59/72; B60W 20/30; B60W 2710/1005; B60W 10/10; B60W 2510/107; B60W 2510/087; B60W 30/1843; B60W 2510/305; B60W 2510/0246; B60W 2540/10; B60W 2540/12; B60W 2520/10
See application file for complete search history.

(56) References Cited

U.S. PATENT DOCUMENTS 5,272,630 A    12/1993    Brown et al.
6,454,677 B2 *  9/2002    Saito .................. F16H 61/20
                                                    477/93

(Continued)

*Primary Examiner* — Roger L Pang
(74) *Attorney, Agent, or Firm* — Brooks Kushman PC; David Kelley (57) ABSTRACT

A system and method for controlling a hybrid vehicle having an engine, a traction motor, and an automatic step-ratio transmission having a plurality of selectable discrete gear ratios, a torque converter, and sharing a common cooling fluid or oil with the traction motor, include a controller configured to shift the automatic step-ratio transmission to neutral in response to vehicle speed being below a threshold with the engine idling while temperatures of at least two of: the traction battery, the electric machine, and the transmission are above associated thresholds to reduce heat generation by the torque converter due to oil shear with the torque converter stalled. The controller may shift the transmission to drive in response to release of a brake pedal. A neutral shift may also be performed in response to high-voltage accessory loads or on-board generator loads exceeding a threshold.

18 Claims, 3 Drawing Sheets

(51) Int. Cl.
  *F16H 59/44*    (2006.01)
  *F16H 59/72*    (2006.01)
  *F16H 59/14*    (2006.01)
  *B60W 30/184*   (2012.01)

(52) U.S. Cl.
  CPC ..... *B60W 2540/10* (2013.01); *B60W 2540/12* (2013.01); *B60W 2710/1005* (2013.01); *F16H 2059/145* (2013.01)

(56) References Cited

U.S. PATENT DOCUMENTS

| | | |
|---|---|---|
| 6,997,275 B2 | 2/2006 | Mesiti et al. |
| 7,044,890 B2 * | 5/2006 | Kojima .................. B60W 10/11 477/901 |
| 9,561,798 B2 * | 2/2017 | Jerger .................... B60W 30/18 |
| 9,944,288 B1 | 4/2018 | Hu et al. |
| 10,267,218 B2 * | 4/2019 | Iwase .................... F16D 48/062 |
| 2001/0041646 A1 * | 11/2001 | Lee ........................ F16H 61/20 477/901 |

* cited by examiner

HYBRID VEHICLE TRANSMISSION SHIFT CONTROL FOR ELECTRIC MACHINE THERMAL MANAGEMENT

TECHNICAL FIELD

This disclosure relates to control of a hybrid vehicle transmission for thermal management of an electric machine.

BACKGROUND

Various hybrid vehicle powertrains may include an internal combustion engine selectively coupled to an electric machine powered by a high-voltage battery such that the vehicle may be propelled by the engine, electric machine, or both. Some vehicles cool the electric machine using transmission oil that may also lubricate, cool, and/or power various hydraulic circuits to control the vehicle transmission.

SUMMARY

Embodiments include a vehicle comprising an engine, an electric machine selectively coupled by a first clutch to the engine, a step-ratio transmission selectively coupled by a second clutch to the electric machine, the step-ratio transmission and the electric machine configured to share a common cooling fluid, and a controller programmed to shift the step-ratio transmission to neutral when the engine is idling, vehicle speed is below a speed threshold, and at least one of a temperature of the electric machine exceeds a first temperature threshold and a temperature of the cooling fluid exceeds a second temperature threshold. The step-ratio transmission may include a torque converter and the second clutch may be implemented by a torque converter lock-up clutch. The controller may be further programmed to shift the step-ratio transmission to drive in response to release of a brake pedal and/or depression of an accelerator pedal. In various embodiments, the electric machine and the step-ratio transmission are positioned within a common housing and share a common volume of cooling fluid, which may be implemented by transmission oil or fluid. The controller may be further programmed to shift the step-ratio transmission to neutral in response to a vehicle high-voltage accessory load and/or on-board generator load exceeding a corresponding current, voltage, or power threshold. The controller may be further programmed to shift the step-ratio transmission to neutral in response to depression of a brake pedal. The first temperature threshold may be less than an electric machine torque derating temperature threshold. The vehicle may further include a high-voltage battery electrically coupled to the electric machine, wherein the controller is further programmed to shift the step-ratio transmission to neutral in response to temperature of the high-voltage battery exceeding a corresponding battery temperature threshold.

Various embodiments may include a system comprising an electric machine selectively coupled to an engine and selectively powered by the traction battery to propel the vehicle, an automatic step-ratio transmission having a plurality of selectable discrete gear ratios and a torque converter, the transmission selectively coupled to the electric machine, and a controller configured to shift the automatic step-ratio transmission to neutral in response to vehicle speed being below a threshold with the engine idling while temperatures of at least two of: the traction battery, the electric machine, and the transmission are above associated thresholds. The controller may be further configured to shift the automatic step-ratio transmission to drive in response to release of a vehicle brake pedal or depression of a vehicle accelerator pedal. In one or more embodiments, the electric machine and the automatic step-ratio transmission are both cooled by a shared volume of transmission oil or other cooling fluid. The controller may be further configured to shift the automatic step-ratio transmission to neutral in response to a high-voltage accessory load exceeding a corresponding voltage, current, or power threshold. The controller may be further configured to shift the automatic step-ratio transmission to neutral in response to depression of a vehicle brake pedal. The controller may be further configured to shift the automatic step-ratio transmission to neutral in response to the vehicle being stopped.

Embodiments may also include a method for controlling a vehicle having an engine, an electric machine coupled to a traction battery, and a step-ratio transmission with a torque converter coupled to the electric machine, the method comprising, by a vehicle controller shifting the step-ratio transmission to neutral while temperatures of at least two of the electric machine, the traction battery, and the step-ratio transmission exceed associated temperature thresholds in response to the vehicle stopping with the engine idling, and shifting the step-ratio transmission from neutral to drive in response to at least one of: releasing a vehicle brake pedal; and depressing a vehicle accelerator pedal, while the vehicle is stopped and the engine is idling. The electric machine and the step-ratio transmission may share a common cooling fluid, such as transmission oil or fluid. The vehicle controller may also shift the step-ratio transmission to neutral in response to vehicle speed decreasing below an associated speed threshold. The vehicle controller may determine the engine is idling based on the vehicle accelerator pedal being fully released. The vehicle controller may shift the step-ratio transmission to neutral further in response to vehicle high-voltage accessory load exceeding a corresponding voltage, current, or power threshold. The vehicle controller may shift the step-ratio transmission to neutral further in response to depression of the brake pedal beyond a corresponding threshold.

Embodiments according to this disclosure may provide associated advantages. For example, this disclosure provides a system and method for thermal management or mitigation of an electric machine without additional heat sinks in the coolant system to reject heat generated by the transmission when the engine is idling with the vehicle stopped. Various embodiments control the transmission of a hybrid vehicle to shift to neutral when the engine is idling to relieve stator reaction torque when the transmission torque converter would otherwise be in a stall condition. Shifting the transmission to neutral allows the clutch between the engine and electric machine to remain engaged so that the electric machine may operate one or more pumps to circulate cooling fluids as well as charge the high-voltage battery to support various vehicle electric loads.

The above advantages and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure could be desired for particular applications or implementations.

Hybrid vehicles having an automatic transmission and particularly those that cool the electric machine via transmission oil may experience insufficient electric machine cooling due to elevated transmission fluid temperature under certain operating conditions. In these systems, the transmission fluid experiences additional heating during engine idle conditions when the torque converter input/impeller is rotating at idle speed with the torque converter output/turbine stalled at zero speed resulting in fluid shear and heat generation. The transmission/electric machine fluid system may be cooled by an oil to engine coolant heat exchanger. When the engine is at idle with the torque converter stalled (typically at low vehicle speed) the engine must produce enough power and torque to maintain idle speed while in this stalled condition. The engine power required results in additional heat rejected by the engine coolant, which in turn cools the transmission less effectively. The present inventors have recognized that the above interactions may adversely impact support for high voltage accessory loads when the electric machine temperature becomes high enough to require torque derating, i.e. limiting the electric machine torque below the capability of the electric machine to mitigate further temperature increase. This condition may be exacerbated when running on-board generator (OBG) loads (sometimes referred to as Power-to-the-Box (PTTB) or Pro-Power Onboard (PPO)) due to the increase in total high voltage accessory load when operating the associated additional inverters. When the high voltage accessory load is unable to be supported, the high voltage battery state of charge will decrease until it reaches the minimum allowed to support all high voltage accessory loads. When the low SOC threshold is reached, the additional PPO inverters will be commanded to shut off. Elevated electric machine temperature also causes a decrease in fuel economy due to an increase in electrical losses at elevated operating temperatures.

As described in greater detail below, one or more embodiments of this disclosure command the transmission to a neutral state at low vehicle speed, engine idling conditions with the brake pedal depressed when conditions that may lead to electric machine derating are encountered. The brake request threshold may be used to indicate that the vehicle is at or near a full stop. Conditions indicative of electric machine derating if not mitigated may be associated with high voltage accessory load, electric machine temperature, battery temperature, and transmission fluid temperature, for example. Use of additional inverters and the electrical load on those inverter(s) can also be used as entry conditions for this strategy. Controlling the transmission to shift to a neutral state allows the transmission torque converter turbine to spin freely which will reduce or eliminate reaction torque and fluid shear that would otherwise be present when the transmission is in a forward or reverse drive gear when the vehicle is stopped or nearly stopped. The reduction in reaction torque will allow the hybrid engine/motor system to provide less torque to maintain the target engine idle speed. The reduction in heat generation in the torque converter will reduce the bulk transmission fluid temperature. Reduction in bulk transmission fluid temperature will allow the fluid temperature delta across the electric machine coil to increase to provide convectional heat transfer to reduce electric machine temperature and allow the electric machine to avoid or exit the temperature-based derating conditions. Reduction of the transmission fluid temperature may also reduce the engine coolant temperature where the engine and transmission share a common heat exchanger. The system may exit the neutral-idle strategy in response to a brake pedal position or release rate and automatically shift the transmission to drive. Transmission fault conditions may also trigger a neutral-idle exit.

Various embodiments may include associated advantages. For example, the reduced engine load during idle may improve engine fuel economy. Avoiding electric machine derating may facilitate better control of the high voltage battery state of charge and avoid current cycling and associated battery temperature increases, which may otherwise result in additional energy for battery cooling. For systems employing a battery chiller that uses the HV A/C compressor, additional battery cooling increases the high voltage accessory load. In addition, operating the electric machine at lower temperatures results in better electric machine efficiency and may further improve energy use and/or fuel economy.

Figure 1:
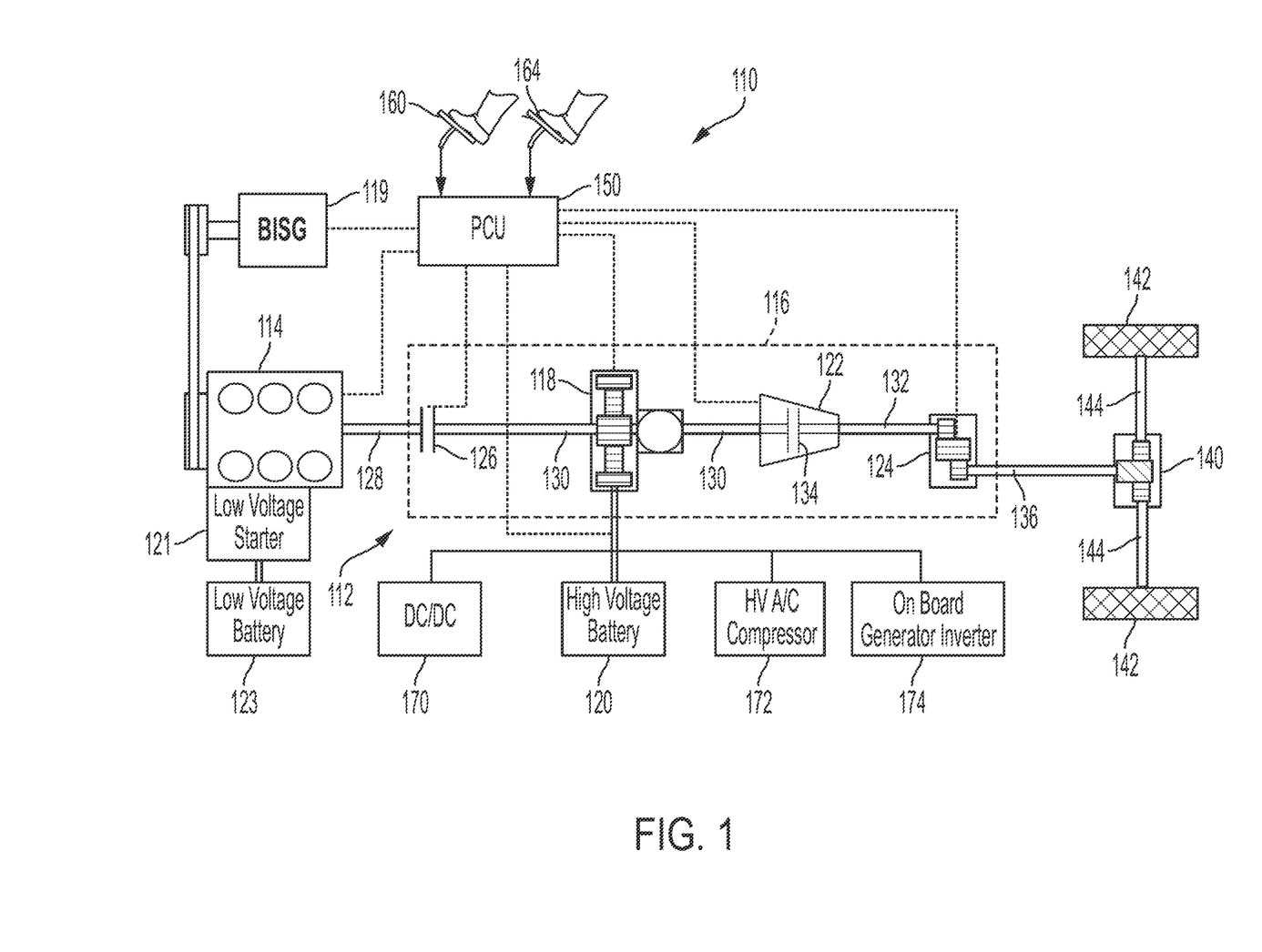
FIG. 1 is a schematic illustration of a hybrid electric vehicle having an automatic step-ratio transmission controlled according to one or more embodiments for thermal management of the electric machine.

Referring to FIG. 1, a schematic diagram of a hybrid electric vehicle (HEV) 110 is illustrated according to an embodiment of the present disclosure. Physical placement and orientation of the components within the vehicle may vary. The HEV 110 includes a powertrain 112. The powertrain 112 includes an engine 114 that drives a transmission system 116, which may be referred to as a modular hybrid transmission (MHT) system. As will be described in further detail below, in various embodiments, transmission system 116 may include an electric machine such as an electric motor/generator (M/G) 118, an associated high voltage traction battery 120, a transmission oil/fluid pump 125, a torque converter 122, and a multiple step-ratio automatic transmission, or gearbox 124. Gearbox 124 may also be implemented by an automated mechanical transmission having one or more electric motors to select one of the multiple discrete gear ratios based on current vehicle and ambient operating conditions or modes.

In addition to M/G 118, HEV 110 may include a one or more additional electric machines, such as belt-driven integrated starter/generator (BISG) 119, which is driven by engine 114. BISG 119 may provide electric energy stored in an associated battery for use in starting engine 114, powering various vehicle electrical loads, or in some applications providing limited propulsive power to HEV 110. Engine 114 may include a low voltage starter motor 121 powered by an associated low voltage auxiliary battery 123.

The engine 114 and the electrical machine 118 are both drive sources for the vehicle 110. The engine 114 generally represents a power source that may include an internal combustion engine such as a gasoline, diesel, or natural gas powered engine, or a fuel cell. The engine 114 generates an engine power and corresponding engine torque that is supplied to the electric machine 118 when a disconnect clutch 126 (which may be referred to as an upstream clutch or first clutch) between the engine 114 and the electric machine 118 is at least partially engaged. The electric machine 118 may be implemented by any one of a plurality of types of electric machines, such as a permanent magnet synchronous motor, for example. Electric machine 118 may also be referred to as a traction motor as it can operate as an electric motor to provide torque to vehicle wheels 142. Power electronics condition direct current (DC) power provided by the traction battery 120 to the requirements of the electric machine 118, as will be described below. For example, power electronics may provide three phase alternating current (AC) to the electric machine 118.

HEV 110 may include a DC/DC converter that converts power from high voltage battery 120 to lower voltage power suitable for various vehicle accessories. Power from DC/DC converter 170 may be used to charge auxiliary battery 123. High voltage DC accessories may be directly powered by a corresponding high voltage bus 180 coupled to high voltage battery 120. High voltage accessories may include an air-conditioning (A/C) compressor 172 or an electric heater, for example. The high voltage bus 180 may also couple one or more inverters, such as on-board generator inverter 174, to power lower voltage AC plug-in accessories. For example, on-board generator inverter 174 may power multiple outlets having single-phase AC nominal voltages of 110/220 V to provide the previously described PPO or PTTB features.

When the disconnect clutch 126 is at least partially engaged, power flow from the engine 114 to the electric machine 118 or from the electric machine to the engine 114 is possible. For example, the disconnect clutch 126 may be engaged and electric machine 118 may operate as a generator to convert rotational energy provided by a crankshaft 128 and electric machine shaft 130 into electrical energy to be stored in the traction battery 120. As described in greater detail below, electric machine 118 may operate as either a motor to increase torque provided to output shaft 136, or as a generator to decrease torque provided to output shaft 136, to allow engine 114 to operate at a desired engine speed and torque operating point to attain a particular system goal, such as fuel efficiency, for example. The disconnect clutch 126 can also be disengaged to isolate the engine 114 from the remainder of the powertrain 112 such that the electric machine 118 can act as the sole drive source for the HEV 110. Shaft 130 extends through the electric machine 118. The electric machine 118 is continuously drivably connected to the shaft 130, whereas the engine 114 is drivably connected to the shaft 130 only when the disconnect clutch 126 is at least partially engaged. When the disconnect clutch 126 is engaged, a fixed speed relationship exists between the speed of the engine 114 and the speed of the electric machine 118.

The electric machine 118 is connected to the torque converter 122 via shaft 130. The torque converter 122 is therefore connected to the engine 114 when the disconnect clutch 126 is at least partially engaged. The torque converter 122 includes an impeller fixed to electric machine shaft 130 and a turbine fixed to a transmission input shaft 132. The torque converter 122 thus provides a hydraulic coupling between shaft 130 and transmission input shaft 132. The torque converter 122 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 134 may also be provided that, when engaged, frictionally or mechanically couples the impeller and the turbine of the torque converter 122, permitting more efficient power transfer. The torque converter bypass clutch 134 may be operated as a launch clutch (also referred to as a downstream clutch or second clutch) to provide a smooth vehicle launch. Alternatively, or in combination, a launch clutch similar to disconnect clutch 126 may be provided between the electric machine 118 and gearbox 124 for applications that do not include a torque converter 122 or a torque converter bypass clutch 134. In some applications, disconnect clutch 126 is generally referred to as an upstream clutch and launch clutch 134 (which may be a torque converter bypass clutch) is generally referred to as a downstream clutch as previously described.

The gearbox 124 may include gear sets (not shown) that are selectively placed in different gear ratios by selective engagement of friction elements such as clutches and brakes (not shown) to establish the desired multiple discrete or step ratios between the input and output of the gear box 124. The friction elements are controllable through a shift schedule that connects and disconnects certain elements of the gear sets to control the ratio between an output shaft 136 and input shaft 132. The gearbox 124 is automatically shifted from one ratio to another based on various vehicle and ambient operating conditions by an associated controller, such as a powertrain control unit (PCU) 150. The gearbox 124 then provides powertrain output torque to output shaft 136. The gearbox 124 may be understood to provide a selectable fixed speed relationship between the speed of electric machine 118 and the speed of vehicle traction wheels 142.

As shown in the representative embodiment of FIG. 1, the output shaft 136 is connected to a differential 140. The differential 140 drives a pair of wheels 142 via respective axles 144 connected to the differential 140. The differential transmits approximately equal torque to each wheel 142 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 112 further includes an associated powertrain control unit (PCU) 150. While illustrated as one controller, the PCU 150 may be part of a larger control system and may be controlled by various other controllers throughout the vehicle 110, such as a vehicle system controller (VSC). It should therefore be understood that the powertrain control unit 150 and one or more other controllers can collectively be referred to as a "controller" that controls various actuators in response to signals from various sensors to control functions such as starting/stopping engine 114, controlling current to operate electric machine 118 to provide wheel torque or charge battery 120, select or schedule transmission shifts, etc. Controller 150 may include a microprocessor or central processing unit (CPU) in communication with various types of non-transitory computer readable storage devices or media. Computer readable storage devices or media may include volatile and nonvolatile or persistent storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, parameters, values, thresholds, etc. used by the controller in controlling the engine 114, electric machine 118, transmission gearbox 124, clutches 126, 134, or various other vehicle systems and components.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 150 may communicate signals to and/or from engine 114, disconnect clutch 126, electric machine 118, launch clutch 134, transmission gearbox 124, DC/DC converter 170, high voltage battery 120, HV A/C compressor 172, on-board generator inverter 174, etc. Although not explicitly illustrated, those of ordinary skill in the art will recognize various functions or components that may be controlled by PCU 150 within each of the subsystems identified above. Representative examples of parameters, systems, and/or components that may be directly or indirectly actuated using control logic, code, or software algorithms executed by the controller to limit a rate of change of electric machine torque according to the disclosure include fuel injection timing, rate, and duration, throttle valve position (to control vacuum or manifold airflow for gas engine applications), spark plug ignition timing (for spark-ignition engines), intake/exhaust valve timing and duration, front-end accessory drive (FEAD) components such as an alternator, air conditioning compressor, battery charger, regenerative braking, power electronics, electric machine operation, clutch pressures for disconnect clutch 126, launch clutch 134, and transmission gearbox 124, and the like. Sensors communicating input through the I/O interface may be used to indicate turbocharger boost pressure, crankshaft position, engine rotational speed (RPM), wheel speeds (WS1, WS2), vehicle speed (VS S), engine coolant temperature (ECT), intake manifold pressure (MAP), accelerator pedal position (PPS) of an accelerator pedal 160, brake pedal position (BPS) of a brake pedal 164, ignition switch position (IGN), throttle valve position (TP), air temperature (TMP), exhaust gas oxygen (EGO) or other exhaust gas component concentration or presence, intake air flow (MAF), transmission gear selection (PRNDL), ratio, or mode, transmission oil temperature (TOT), transmission turbine speed (TS), torque converter bypass clutch 34 status (TCC), deceleration or shift mode (MDE), electric machine current or torque, electric machine temperature, accessory load, or traction battery state-of-charge, for example.

Figure 2:
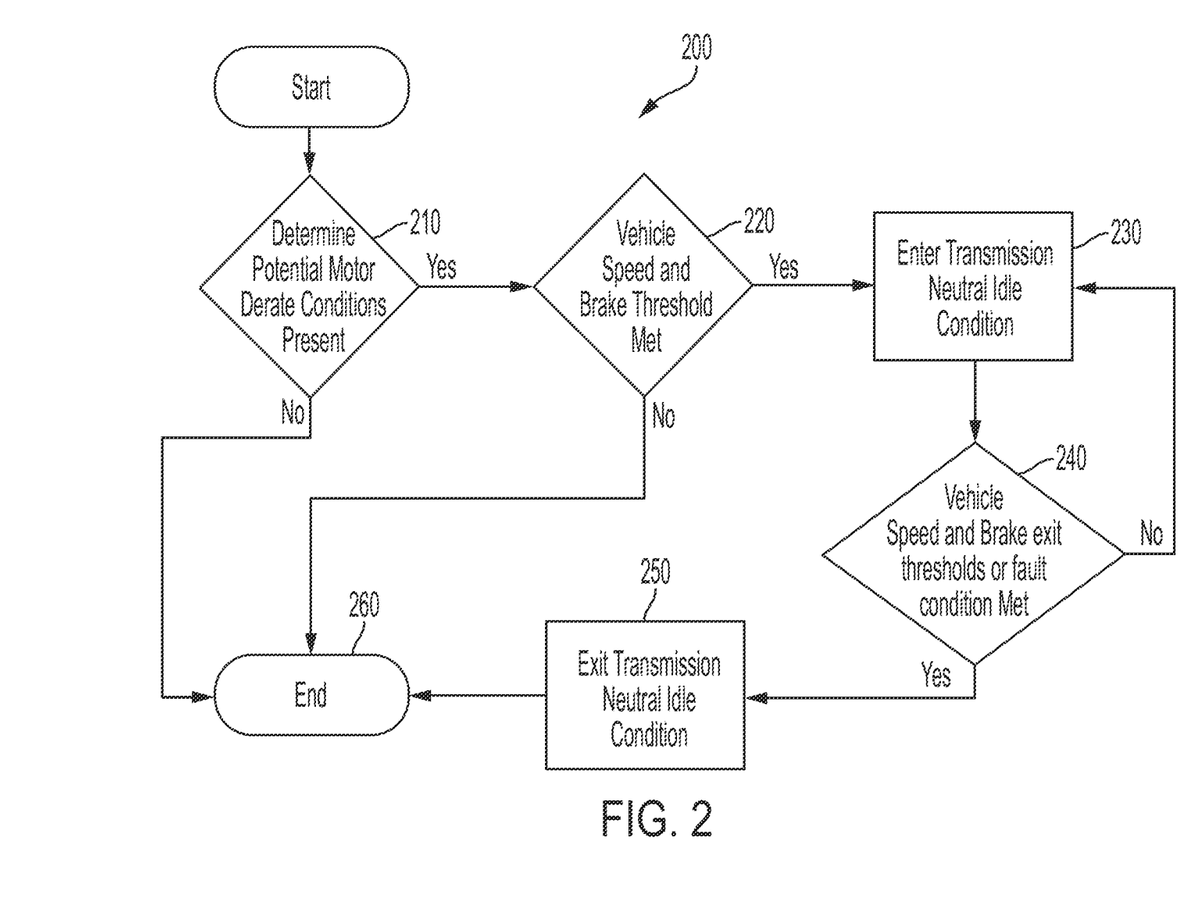
FIG. 2 is a flow chart illustrating operation of a system or method for controlling an automatic transmission of a hybrid vehicle to inhibit electric machine derating.
Figure 3:
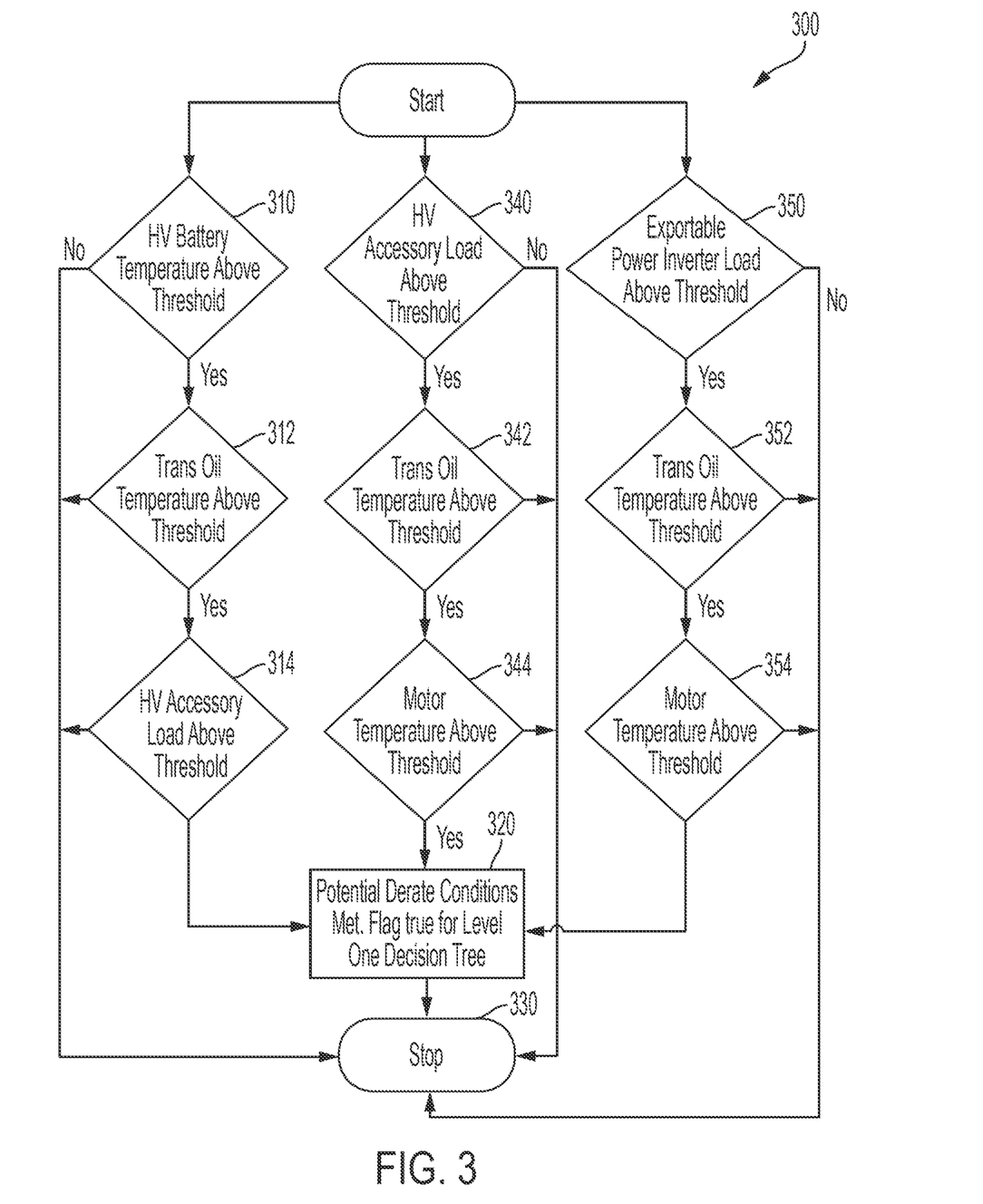
FIG. 3 is a flow chart illustrating conditions that may trigger control of a hybrid vehicle automatic transmission to provide electric machine thermal management and inhibit electric machine derating.

Control logic or functions performed by PCU 150 may be represented by flow charts or similar diagrams in one or more figures, such as the diagram of FIG. 1 or the flowcharts of FIGS. 2-3. These figures provide representative control strategies, algorithms, and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 150. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Accelerator pedal 160 is used by the driver of the vehicle to provide a driver demanded torque, power, or drive command to propel the vehicle. In general, depressing and releasing the accelerator pedal 152 generates an accelerator pedal position signal that may be interpreted by the controller 150 as a demand for increased power or decreased power, respectively. Accelerator pedal position may also trigger regenerative braking, or exiting of a neutral-idle mode as described herein. Some vehicle applications and/or operating modes may determine driver demanded torque using inputs other than the pedal 152, such as when operating in cruise control, one-pedal drive, or when used in an autonomous vehicle application, for example. The controller 150 commands torque from the engine 114 and/or the electric machine 118 to provide the driver demand torque. The controller 150 also controls the timing of gear shifts within the gearbox 124, including shifting to a neutral state or from a neutral state to a drive (forward/reverse) state as well as engagement or disengagement of the disconnect clutch 126 and the torque converter bypass clutch 134. Like the disconnect clutch 126, the torque converter bypass clutch 134 can be modulated across a range between the engaged and disengaged positions. This produces a variable slip in the torque converter 122 in addition to the variable slip produced by the hydrodynamic coupling between the impeller and the turbine. Alternatively, the torque converter bypass clutch 134 may be operated as locked or open without using a modulated operating mode depending on the particular application.

To drive the vehicle with the engine 114, the disconnect clutch 126 is at least partially engaged to transfer at least a portion of the engine torque through the disconnect clutch 126 to the electric machine 118, and then from the electric machine 118 through the torque converter 122 and gearbox 124. The electric machine 118 may supplement or absorb torque produced by the engine 114 so that engine 114 may operate at or near a selected engine speed/torque operating point.

To drive the vehicle with the electric machine 118 as the sole power source, the power flow remains the same except the disconnect clutch 126 isolates the engine 114 from the remainder of the powertrain 112. Combustion in the engine 114 may be disabled or otherwise OFF during this time to conserve fuel. The traction battery 120 transmits stored electrical energy through bus 180 to DC/DC converter 170, HV components 172, and one or more inverters 174.

In any mode of operation, the electric machine 118 may act as a motor and provide a driving force for the powertrain 112. Alternatively, the electric machine 118 may act as a generator and convert kinetic energy from the powertrain 112 into electric energy to be stored in the battery 120. The electric machine 118 may act as a generator while the engine 114 is providing propulsion power for the vehicle 110, for example. The electric machine 118 may additionally act as a generator during times of regenerative braking in which rotational energy from spinning wheels 142 is transferred back through the gearbox 124 and is converted into electrical energy for storage in the battery 120.

Gearbox 124 is a step-ratio gearbox with a finite number of selectable discrete gear ratios including at least one reverse and multiple forward ratios. The two primary gear state differentiations provided in this disclosure include a drive (in forward/reverse gear) and neutral. The drive (in gear) state refers to the state where the torque converter turbine (input shaft) to the transmission gear box is connected to the output 136 of the transmission gear box 124 with a given torque and speed ratio (gear ratio). The neutral state refers to a condition where the input 132 of the transmission is not secured for rotation with the output 136 of the transmissions with a defined gear ratio.

In one or more embodiments, electric machine 118 may share a common cooling fluid or oil with torque converter 122 and transmission gearbox 124. Electric machine 118, torque converter 122, transmission gearbox 124, and upstream clutch 126 may be positioned within a common housing. HEV 110 may include a cooling system having one or more cooling circuits that circulate a thermal exchange fluid and associated heat exchangers or radiators. In one embodiment, HEV 110 includes cooling circuits for engine 114, electric machine 118, transmission torque converter 122 and gearbox 124, high voltage battery 120, and inverter(s) 174. Coolant may be circulated through the corresponding coolant loops by an associated coolant fluid pump. Transmission coolant may be cooled via an engine coolant to transmission coolant fluid heat exchanger. The transmission system may also have an optional exterior transmission cooler with coolant lines circulating the transmission oil through an external radiator.

It should be understood that the schematic illustrated in FIG. 1 is merely representative and is not intended to be limiting. Other configurations are contemplated that utilize selective engagement of both an engine and a motor to transmit torque through the transmission. For example, the electric machine 118 may be offset from the crankshaft 128, an additional motor may be provided to start the engine 114, and/or the electric machine may be provided between the torque converter 122 and the gearbox 124. Other configurations are contemplated without deviating from the scope of the present disclosure.

As generally illustrated in FIG. 1 and explained in greater detail below, in one or more embodiments, vehicle 110 includes an engine 114, an electric machine 118 selectively coupled by a first clutch 126 to the engine 114, a step-ratio transmission 124 selectively coupled by a second clutch 134 to the electric machine 118, and a controller 150 programmed to shift the step-ratio transmission 124 to neutral when the engine 114 is idling, vehicle speed is below a speed threshold, and at least one of a temperature of the electric machine 118 exceeds a first temperature threshold and a temperature of the cooling fluid exceeds a second temperature threshold. In some embodiments, controller 150 is programmed to shift transmission gearbox 124 to neutral when brake pedal 164 is depressed beyond a threshold and/or accelerator pedal 160 is fully released, which may indicate engine idle conditions. Controller 150 may be further programmed to shift the step-ratio transmission gearbox 124 from neutral to drive in response to release of brake pedal 164 and/or in response to depression of accelerator pedal 160.

Referring to FIGS. 1 and 2, control logic 200 for controlling gearbox 124 to provide a neutral-idle operating mode or strategy to inhibit electric machine 118 temperature derating is shown. Potential electric machine derating conditions are monitored as represented at 210. Representative conditions or parameters are illustrated and described in greater detail with reference to FIG. 3. If the monitored conditions or parameters to not meet the corresponding criteria to set a corresponding flag or trigger the neutral-idle strategy, the logic ends as indicated at 260. If the criteria are satisfied as indicated at 210, then block 220 determines whether vehicle speed and braking thresholds have been satisfied. The vehicle speed threshold may be satisfied when the vehicle speed is below the threshold or stopped depending on the particular embodiment. The braking threshold may be a particular position of the brake pedal 164 indicating an amount or level of braking requested, a rate of depression, or a switch indicating depression of the brake pedal. Alternatively, brake pressure may be used. Various embodiments may use one or the other threshold, or different thresholds than those illustrated.

If block 220 criteria are not satisfied, the strategy ends as indicated at 260. Otherwise, the strategy or logic activates the neutral-idle state or condition as indicated at 230. When the neutral-idle state is activated at 230, the controller 150 controls the transmission gearbox 124 to shift to neutral when the engine 114 is idling to reduce or eliminate heat generation of the transmission torque converter 122 due to fluid shear at stall conditions as previously described. Block 240 determines whether neutral-idle state exit conditions have been satisfied, such as vehicle speed exceeding a threshold, brake pedal released, or accelerator pedal depressed, for example. Various fault conditions associated with the transmission gearbox 124, brake pedal 164, or various other vehicle components may also satisfy the exit conditions at block 240. If exit conditions are satisfied at 240, then the neutral-idle exit state is entered at 250 and the controller 150 controls transmission gearbox 124 to shift from neutral to drive. The strategy then ends as indicated at 260.

FIG. 3 is a flow chart illustrating conditions that may trigger control of a hybrid vehicle automatic transmission to provide electric machine thermal management and inhibit electric machine derating. The representative logic and parameters 300 illustrated in the embodiment of FIG. 3 may vary depending on the particular application and implementation including the particular number and arrangement of cooling circuits, heat exchangers, and associated vehicle components that generate heat that may impact thermal management of the electric machine. In addition, various conditions or requirements illustrated in combination or sequence may be used alone or in combination with other conditions or requirements to trigger a neutral-idle strategy according to the disclosure. As recognized by those of ordinary skill in the art in light of the teachings of this disclosure, the representative parameters and conditions illustrated may lead to increased thermal loading of various components that may adversely impact thermal management of the electric machine, particularly when the electric machine shares thermal management features, such as a common shared cooling fluid with one or more other vehicle components, such as a transmission torque converter and/or gearbox. Temperatures or electrical loads may be sensed or measured by a dedicated sensor, or may be estimated or otherwise determined by an associated sensor for the particular component or associated components. Thresholds may be provided by comparing a measured or estimated value to a corresponding value stored in a memory or other computer-readable storage medium, or may be provided by electrical or electronic switches or devices such as a thermal switch, transistor, comparator, etc.

Logic or strategy 300 implemented by one or more processors or controllers and related hardware determines whether the high voltage battery temperature is above a corresponding threshold at 310, whether the transmission oil temperature is above a corresponding threshold at 312 and whether the high voltage accessory load is above a corresponding threshold (voltage, current, or power) at 314. If all of the conditions at 310, 312, 314 are met, then a corresponding flag is set as indicated at 320. Otherwise, if any of the conditions at 310, 312, 314 are not satisfied, the determination ends at 330.

Similarly, if the high voltage accessory load is above a corresponding threshold at 340, transmission oil temperature is above a corresponding threshold at 342, and electric machine temperature is above a corresponding threshold at 344, then a corresponding flag indicative of potential electrical machine derating conditions is set at 320. Otherwise, if any of the conditions 340, 342, 344 is not satisfied, the determination ends at 330 without setting the derating conditions flag. Likewise, if the on-board generator (exportable power inverter) load is above a corresponding threshold (voltage, current, or power) at 350, transmission oil temperature is above a corresponding threshold at 352, and electric machine temperature is above a corresponding threshold at 354, then the potential electrical machine derating condition flag is set at 320. Otherwise, if any of the criteria or conditions 350, 352, 354 are not met, then the determination ends at 330 without setting the derating conditions flag.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as RAM devices, flash devices and/or other solid state storage devices. The processes, methods, or algorithms can also be implemented in a software executable object or code. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, firmware, and software components.

While representative embodiments are described above, it is not intended that these embodiments describe all possible forms of the invention. The words used in the specification are words of description rather than limitation, and it is understood that various changes can be made without departing from the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications or implementations.

What is claimed is:

1. A vehicle comprising:
an engine;
an electric machine selectively coupled by a first clutch to the engine;
a step-ratio transmission selectively coupled by a second clutch to the electric machine, the step-ratio transmission and the electric machine configured to share a common cooling fluid; and
a controller programmed to shift the step-ratio transmission to neutral when the engine is idling, vehicle speed is below a speed threshold, and at least one of a temperature of the electric machine exceeds a first temperature threshold and a temperature of the cooling fluid exceeds a second temperature threshold, and wherein the controller is further programmed to shift the step-ratio transmission to neutral in response to a vehicle high-voltage accessory load exceeding a corresponding threshold.

2. The vehicle of claim 1 wherein the step-ratio transmission comprises a torque converter and the second clutch comprises a torque converter lock-up clutch.

3. The vehicle of claim 2 wherein the controller is further programmed to shift the step-ratio transmission to drive in response to release of a brake pedal.

4. The vehicle of claim 1 wherein the electric machine and the step-ratio transmission are positioned within a common housing.

5. The vehicle of claim 1 wherein the controller is further programmed to shift the step-ratio transmission to neutral in response to depression of a brake pedal.

6. The vehicle of claim 1 further comprising a high-voltage battery electrically coupled to the electric machine, wherein the controller is further programmed to shift the step-ratio transmission to neutral in response to temperature of the high-voltage battery exceeding a corresponding battery temperature threshold.

7. A system comprising:
an electric machine selectively coupled by an upstream clutch to an engine and selectively powered by a traction battery to propel the vehicle;
an automatic step-ratio transmission having a plurality of selectable discrete gear ratios and a torque converter, the transmission selectively coupled to the electric machine; and
a controller configured to:
shift the automatic step-ratio transmission to neutral in response to vehicle speed being below a threshold with the engine idling while temperatures of at least two of: the traction battery, the electric machine, and the transmission are above associated thresholds.

8. The system of claim 7 wherein the controller is further configured to shift the automatic step-ratio transmission to drive in response to release of a vehicle brake pedal or depression of a vehicle accelerator pedal.

9. The system of claim 8 wherein the electric machine and the automatic step-ratio transmission are both cooled by a shared volume of transmission oil.

10. The system of claim 7 wherein the controller is further configured to shift the automatic step-ratio transmission to neutral in response to a high-voltage accessory load exceeding a corresponding threshold.

11. The system of claim 7 wherein the controller is further configured to shift the automatic step-ratio transmission to neutral in response to depression of a vehicle brake pedal.

12. The system of claim 11 wherein the controller is further configured to shift the automatic step-ratio transmission to neutral in response to the vehicle being stopped.

13. A method for controlling a vehicle having an engine, an electric machine coupled to a traction battery, and a step-ratio transmission with a torque converter coupled to the electric machine, the method comprising, by a vehicle controller:
shifting the step-ratio transmission to neutral while temperatures of at least two of the electric machine, the traction battery, and the step-ratio transmission exceed associated temperature thresholds in response to the vehicle stopping with the engine idling; and
shifting the step-ratio transmission from neutral to drive in response to at least one of: releasing a vehicle brake pedal; and depressing a vehicle accelerator pedal, while the vehicle is stopped and the engine is idling.

14. The method of claim 13 wherein the electric machine and the step-ratio transmission share a common cooling fluid.

15. The method of claim 14 wherein the vehicle controller shifts the step-ratio transmission to neutral in response to vehicle speed decreasing below an associated speed threshold.

16. The method of claim 14 wherein the vehicle controller determines the engine is idling based on the vehicle accelerator pedal being fully released.

17. The method of claim 14 wherein the vehicle controller shifts the step-ratio transmission to neutral further in response to vehicle high-voltage accessory load exceeding a corresponding threshold.

18. The method of claim 17 wherein the vehicle controller shifts the step-ratio transmission to neutral further in response to depression of the brake pedal.

\* \* \* \* \*